Jan. 14, 1941. B. C. PLACE 2,228,584
FASTENER CLIP
Filed Oct. 26, 1936
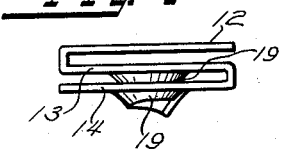
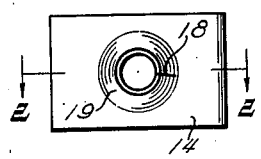
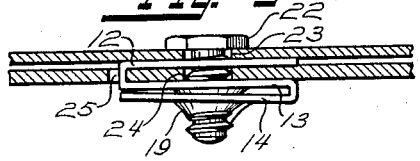
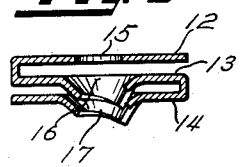
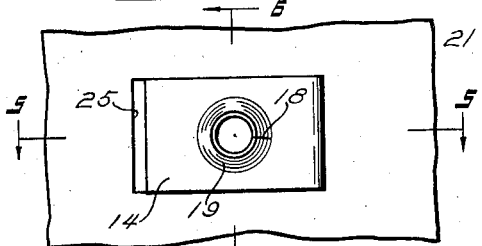
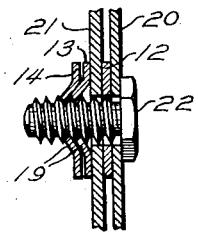
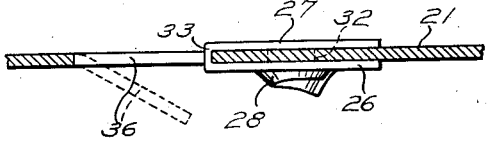
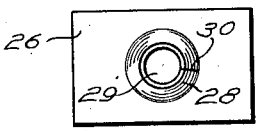
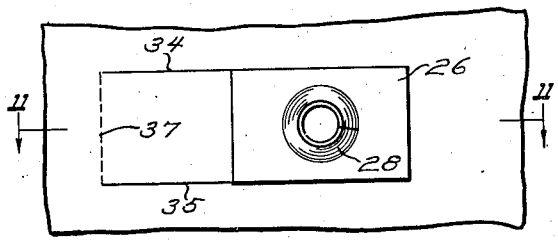
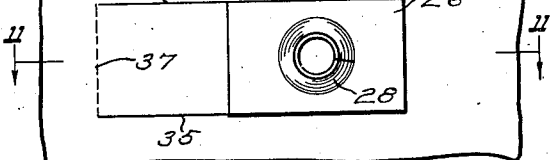
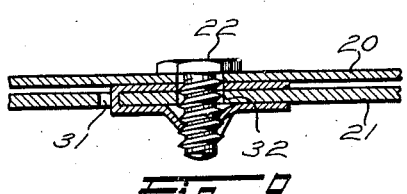
Inventor
Bion C. Place
By Strauch & Hoffman
Attorneys Patented Jan. 14, 1941

2,228,584

UNITED STATES PATENT OFFICE 2,228,584

FASTENER CLIP

Bion C. Place, Detroit, Mich., assignor, by mesne assignments, to Detroit Harvester Company, Detroit, Mich., a corporation of Michigan Application October 26, 1936, Serial No. 107,721

1 Claim. (Cl. 85—36)

The present invention relates to a fastener clip designed so as to be readily associated with a sheet metal structure to prepare it for the reception of a screw or bolt. More particularly, the invention is concerned with a fastener clip having a portion designed to function as a washer to eliminate rattles and squeaks, between members secured together by a bolt or screw, and a portion or portions particularly designed for threaded engagement with the bolt or screw in such a way as to prevent unscrewing of the bolt or screw.

The primary object of the present invention is to provide a clip, that may be readily associated with a sheet metal structure to provide said structure with threads of substantial strength for the reception of a bolt or screw, and so designed that when the screw is turned to its holding position the thread will grip the shank of the screw and prevent reverse rotation thereof.

Another object of the invention is to provide a fastener clip constructed of sheet metal and formed to provide ample thickness for the reception of a threaded fastener by doubling the sheet metal and passing the threaded fastener through aligned openings in the doubled portions of the clip.

A still further object of the invention is to provide an improved fastening clip constructed so as to be readily assembled with respect to the portion of a sheet metal structure having an opening for the passage of a threaded fastener and so that the openings in the clip will be aligned with the opening in the structure when the clip is assembled in the intended manner.

Still further objects of the invention will appear as the description thereof proceeds with reference to the accompanying drawing in which:

Figure 1 is a side elevational view of the preferred form of fastening clip.

Figure 2 is a plan view of the clip as illustrated in Figure 1.

Figure 3 is a sectional view taken on the plane indicated by the line 3—3 in Figure 2, the clip being reversed.

Figure 4 is a fragmentary plan view of a structure having a clip such as illustrated in Figures 1, 2 and 3 assembled therewith in the manner contemplated by the present invention.

Figures 5 and 6 are respectively sectional views taken on the plane indicated by the lines 5—5 and 6—6 in Figure 4.

Figures 7 and 8 are respectively plan and side elevational views of a modified form of clip.

Figure 9 is a sectional view corresponding to Figure 5, illustrating the preferred way of utilizing the clip illustrated in Figures 7 and 8.

Figure 10 is a fragmentary plan view of a modified way of applying the clip illustrated in Figures 7 and 8 to a supporting structure.

Figure 11 is a sectional view taken on the plane indicated by the line 11—11 in Figure 10.

Like reference characters indicate like parts throughout the several figures.

The fastener clip of the present invention is constructed from a narrow elongated band of sheet metal by bending said blank into substantially S-shaped form, providing a portion 12 which serves as a washer as hereinafter pointed out, and two approximately parallel portions 13 and 14, which are each provided with threads, preferably in a manner hereinafter described. Before bending the blank into said form illustrated, it is provided with three openings. An opening 15 is formed in the portion 12, and openings 16 and 17 are formed in the portions 13 and 14 respectively. Also before bending the clip into S-shaped form, the walls of the openings 16 and 17 are shaped to provide a spiral thread having the thickness of the blank from which the clip is formed. In order to provide such threads, a slit 18 extending substantially radially of the openings 16 and 17 is punched in the blank and a conical protuberance 19 is formed around each opening 16 or 17. The openings 16 and 17 are initially much smaller than the diameter of the screw intended to be threaded therethrough, but said openings are enlarged to the diameter of the screw at the base of the thread during the die-shaping or forming of the conical protuberances 19, which have a base preferably exceeding more than twice the diameter of the opening. The slits 18 in each protuberance permit the thread of the screw to pass into engagement with the helical wall surrounding the opening, which helical wall is constructed of a pitch approximating the pitch of the screw for which the clip is designed. The way of providing the threads on each of the portions 13 and 14, in the manner just briefly described, is pointed out in greater detail in application Serial Number 87,292, filed June 25, 1936.

While the arrangement described in said application is preferred, it will be understood that the walls of the openings 16 and 17 may be adapted for the reception of the threads of a screw or bolt in any other manner known in the art. When the fastener clip is constructed in the preferred manner, it will be understood that the completed clip provides two complete threads arranged in alignment in the portions 13 and 14 respectively, and that each of the threads has great strength inasmuch as it has the same thickness as the thickness of the sheet metal from which it is preferably constructed. If desired, the clip may be tempered after it is formed, but in most instances tempering of the fastener clip of the present invention is not necessary.

The fastener clip just described is preferably used in the manner illustrated in Figures 4, 5 and 6 in which 20 and 21 illustrate two sheet metal elements or members which are to be bolted together by means of a bolt 22. The members 20 and 21 are provided with aligned openings 23 and 24 for the passage of the shank of the bolt. In order to apply the fastener clip to the member 21 it is provided with an opening 25, spaced laterally of the opening 24, the opening 25 being arranged so that when the clip is hooked on the member 21 by passing the portion 12 through the opening 25, the openings 15, 16 and 17 will be aligned with the openings 23 and 24 in the members 20 and 21. The portion 12 is spaced from the portion 13 preferably so that the clip will frictionally grip the member 21 between the jaws provided by portions 12 and 13, so that the clip will remain in place after it has been engaged on member 21. The bolt 22 is then passed through the aligned openings and threaded through the portions 13 and 14. It will be understood that as the screw is drawn taut the threads in contact with the threads formed on the portions 13 and 14 will tend to flatten the conical protuberances 19 as portion 13 first firmly contacts with member 21 and as portion 14 is then drawn into contact with portion 13, thus causing the openings in said protuberances to be contracted into firm frictional engagement with the shank of the screw. Such engagement prevents reverse rotation of the bolt. The members 20 and 21 may thus be fixedly secured together by the bolt 22, the two strong threads providing ample strength in the connection between the fastener clip and the bolt. When the arrangement has been completely assembled it will be understood that the portion 12 of the fastener clip serves as a spacer between the members 20 and 21 and serves the function of a washer in eliminating rattles and squeaks at the point of connection between said members.

In the modified form of clip illustrated in Figures 7 and 8, only a single threaded portion 26 is provided, the clip being in U-shaped form and also including a portion 27 corresponding in function and structure to the portion 12 of the fastening clip first described. The portion 26 is preferably provided with a conical protuberance 28 having an opening 29, the wall of which is disposed on a helix having the pitch of the screw or bolts with which the clip is to be used. A slit 30 permits entry of the thread of the bolt or screw. Preferably the thread is formed in the manner described in greater particularity in application Serial Number 87,292 already referred to.

The clip of Figures 7 and 8 is used in the manner illustrated in Figure 9 by hooking it on the member 21 through an opening of sufficient size 31, formed therein, the opening 31 being located so that when the clip is in its engaged position the openings in the portions 26 and 27 are aligned with the openings 32 in the member 21. Members 20 and 21 are secured together by engaging the threads of the bolts 22 with the thread formed in the portion 26, in this instance, a single thread of the thickness of the sheet of metal from which the clip is formed being relied upon to provide the desired engagement between the bolts and the clips. The arrangement of this form of the invention is satisfactory when unusual strength and holding power is not required.

In the arrangement illustrated in Figures 10 and 11, an alternative way of engaging the clip of Figures 7 and 8 with the member 21 is disclosed. In this form of the invention a rectangular opening is formed in the member 21 having a size corresponding to the cross-section of the connecting portion 33 of the clip, and slits 34 and 35 are formed extending in parallelism from said opening in a direction away from the opening 32 in said members. The tongue 36 thus separated is bent on the line 37 to the position illustrated in dotted lines in Figure 11 permitting ready engagement of the clip upon the member 21. After said member has been engaged, the tongue 36 is bent back to full line position and serves to fixedly interlock the clip into irremovable engagement with the member 21 with the openings in the clip in alignment with the opening 32 in the member 21. When this arrangement is used, it is not necessary that the clip be gripped between the jaws formed by the portions 26 and 27 as in the form of the invention before described. It will be understood as a matter of course that the S-shaped clip of Figures 1, 2 and 3 may be applied in the manner illustrated in Figures 10 and 11.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A fastener adapted to be attached to two members arranged in superposition and having aligned apertures, said fastener comprising a clip having three approximately parallel portions each having an opening, the openings in said portions being arranged in alignment with said apertures, one of said portions being disposed between the superposed members and the other two above one of the members, and a screw passing through all of said apertures and openings and in threaded engagement with said other two portions, each of said other portions having a substantially frusto-conical protuberance provided with a central opening, the edge of the opening being in the form of an helix to receive the thread of a screw, and the protuberance on one portion extending partially into the protuberance on the other portion.

BION C. PLACE.